No. 634,866. Patented Oct. 17, 1899.
W. F. BEASLEY.
METHOD OF MANUFACTURING CELLULAR TIRES.
(Application filed Feb. 23, 1899.)
(No Model.)
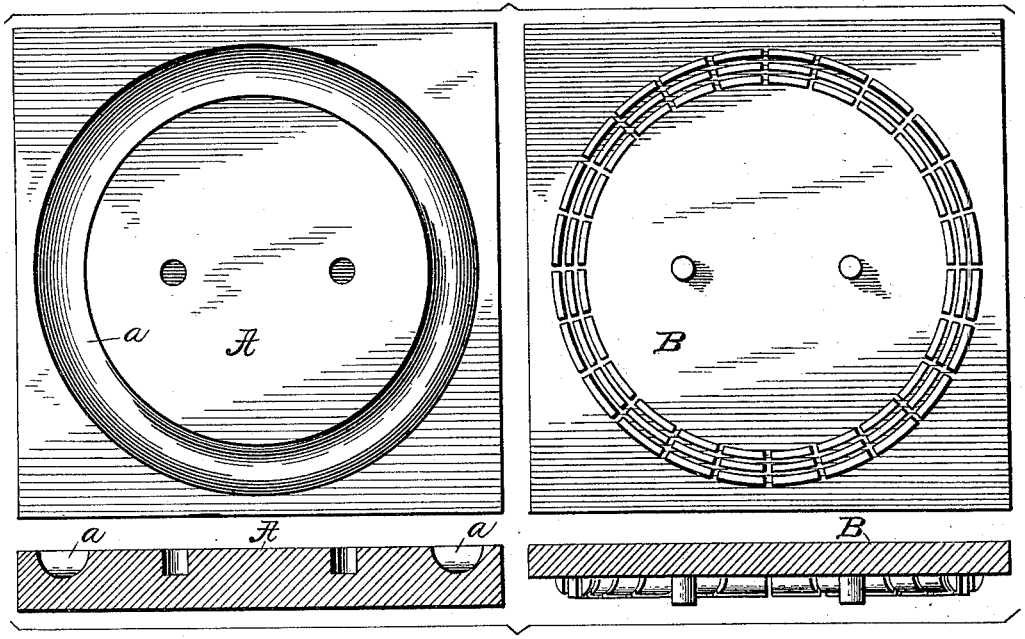
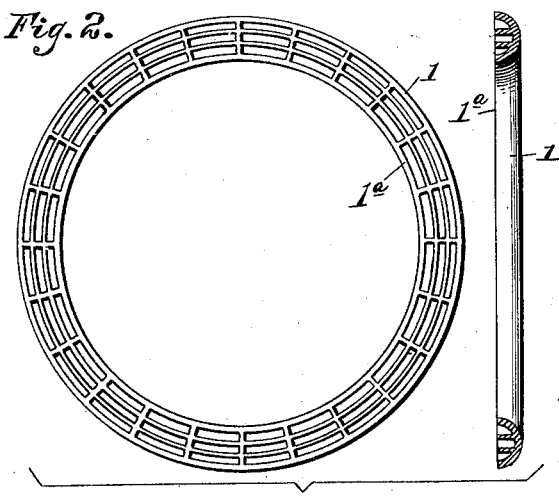
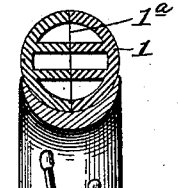
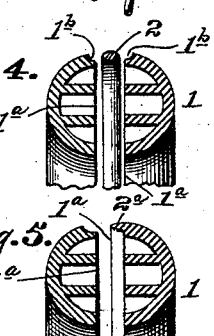
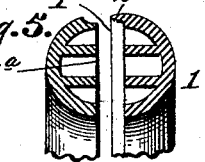
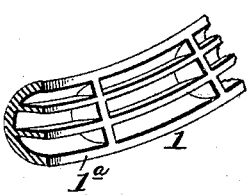
Witnesses
Inventor
William F. Beasley
Attorney

UNITED STATES PATENT OFFICE.

WILLIAM F. BEASLEY, OF PLYMOUTH, NORTH CAROLINA.

METHOD OF MANUFACTURING CELLULAR TIRES.

SPECIFICATION forming part of Letters Patent No. 634,866, dated October 17, 1899.

Application filed February 23, 1899. Serial No. 706,482. (No specimens.)

*To all whom it may concern:*

Be it known that I, WILLIAM F. BEASLEY, a citizen of the United States of America, and a resident of Plymouth, county of Washington, State of North Carolina, have invented certain new and useful Improvements in Cellular Tires and Methods of Manufacturing the Same, of which the following is a specification.

It has heretofore been proposed to construct a tire having its interior divided into a number of cells or compartments by means of interior walls, and the process of making such tires has been to mold two similarly-shaped straight strips, each semicircular in cross-section and each having corresponding cell-chambers formed therein. These strips have been then brought together, with their flat faces adjacent to each other, and vulcanized, forming a straight tubular body with internal compartments. The straight tubular body thus formed has then had its two ends brought together and vulcanized, forming a cellular tire. These tires have in use upon bicycles and other vehicles in which the cross-section of the tire is comparatively small given satisfaction; but difficulty has been experienced in applying a tire so constructed to automobiles or other vehicles demanding a tire of large cross-section. This difficulty arises from the fact that in bending the straight tire-tube to an annular form to complete the tire the opposite peripheries of the tube must assume different lengths to provide for the greatly different circumference of the inner periphery or inner face of the tire and outer periphery or tread-face thereof, and thus while the material upon the inner periphery is placed under compression the material upon the outer periphery is placed under tension, and this renders such a tire non-expansive. As is well known, the type of rims now in common use and intended to receive rubber tires is formed with an annular groove upon its outer periphery in which the tire is seated, the tire being sprung into place over the side flanges; but the non-expansive nature of cellular tires constructed as above prevents their being placed upon rims in this manner and has retarded their use upon automobiles or other vehicles. This is not true, however, of the ordinary pneumatic tire, for such tires when deflated have a larger diameter than when inflated.

The object of my invention is to provide a method of making cellular tires and a cellular tire having all parts thereof under equal tension, so that such tires of all sizes may be readily placed upon corresponding rims, and these objects I effect by molding the tire in two annular D-shaped cellular sections, each section having its flat face in the plane of revolution of the tire, and by then bringing the two molded annular sections above specified together face to face while in the mold in which they were formed and vulcanizing.

A further object of my invention consists in forming upon the tread of such tires and above the joint between the two sections a tread section or part adapted to receive the wear and protect the joint.

My invention also consists in the construction, arrangement, and combination of the several parts of which it is composed, as will be hereinafter more fully described and claimed.

Referring to the accompanying drawings, in which corresponding parts are designated by corresponding marks of reference, Figure 1 shows the two halves of a tire-mold, showing each part in plan and section. Fig. 2 shows a tire-section in elevation and section constructed in accordance with this invention. Fig. 3 is a section taken through my improved tire, showing it as mounted upon a wheel-rim. Figs. 4 and 5 illustrate the use of a supplemental tread-section to protect the joint between the main sections of the tire, the sections being shown slightly separated for purposes of illustration. Fig. 6 is a perspective fragmental view of the tire-section shown in Fig. 2.

In the carrying out of my improved process I make use of a mold, one part, A, of which has an annular semicircular channel $a$ therein and the other part, B, of which has suitable projections thereon, and molded from the raw rubber a tire-section 1, of D-shaped cross-section, the flat face $1^a$ of the section being transverse to the axis of the tire and in the plane of revolution of the tire. Two such sections having been made in the manner described, the flat faces $1^a$ of each section while still in the molds in which they are formed are brought together and vulcanized. By this method a complete tire such as is shown in cross-section in Fig. 3 is formed, the two sections thereof lying on opposite sides of the plane of revolution of the tire. As each tire-section has been molded directly into annular form from the raw rubber, all parts of each section will be under equal tension, and the same will be true of the completed tire formed of the two sections. This permits the tire to be readily expanded and slipped upon the vehicle-wheel. As the joint between the two sections lies in the plane of revolution of the wheel, the tread portion thereof is liable to be injured in use, and for the purposes of protecting said portions I have devised the construction shown in Figs. 4 and 5.

In Fig. 4 each of the main tire-sections 1 has a depression 1$^b$ formed at its outer edge, so that when the two sections are brought together an annular channel will be formed around the tread-face of the tire. In this channel I place a cylindrical tread-section 2, which not only receives the wear, but also protects the joint.

In Fig. 5 instead of making the tread-section distinct from the main sections it is made in the form of a flap 2$^a$, projecting from one of the main sections and secured on the opposite section, thus breaking joint with the line of separation between the sections. In this construction, however, it will be noted that the tread-section is not removable independent of the main section to which it is attached. It is obvious that the integral flap 2$^a$ may be, if desired, in the form of the cylindrical tread-section 2. (Shown in Fig. 4.)

Having thus described my invention, what I claim, and desire to secure by Letters Patent, is—

1. The hereinbefore-described method of manufacturing cellular rubber tires for vehicles, consisting in forming the tire in two sections, divided in the plane of revolution of the tire each section being molded from the raw rubber directly into an annular form, and vulcanizing the flat faces of each of the two sections together while still in the mold in which they were formed to form the completed tire, whereby all parts of the tire are under equal tension, substantially as described.

2. A cellular tire composed of two main sections divided in the plane of revolution of the tire and a tread-section breaking joint with the two main sections thereof, substantially as described.

3. A cellular tire composed of two sections separated in the plane of revolution of the wheel and having a removable tread-section located around the outside of the joint between the sections, substantially as described.

Signed by me this 9th day of February, 1899.

WILLIAM F. BEASLEY.

Witnesses:
VERNON M. DORSEY,
E. T. HUGHES.